Patented Aug. 5, 1952

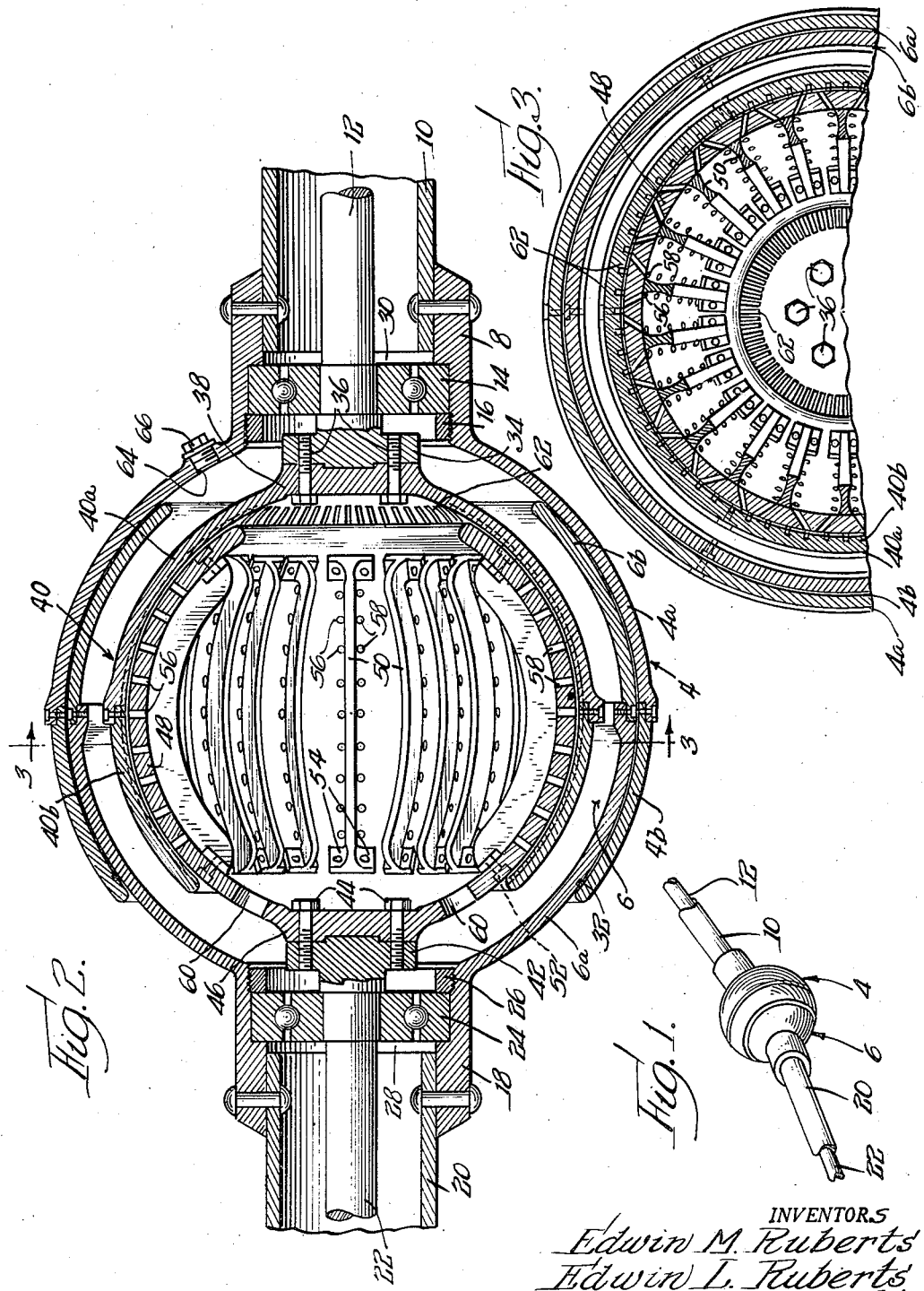

2,605,614

UNITED STATES PATENT OFFICE 2,605,614

HYDRODYNAMIC UNIVERSAL JOINT

Edwin L. Ruberts and Edwin M. Ruberts, Ottawa, Ill.; said Edwin M. Ruberts assignor to said Edwin L. Ruberts Application November 29, 1946, Serial No. 713,170

11 Claims. (Cl. 60—54)

The present invention relates in general to hydro-dynamic couplings and, in particular, to an improved form of universal joint wherein power is transmitted between driving and driven shafts through a fluid transmission medium.

One application for which the universal joint of the present invention is particularly suited is the transmission of power to the wheels of an automobile employing a front wheel drive. The mechanically coupled type of universal joints heretofore employed for this purpose are short-lived, due to the severe operating conditions to which they are subjected in such service.

It is an object of the present invention to provide a universal joint which is extremely rugged and durable and is well adapted to transmit power between misaligned shafts under severe operating conditions such as that encountered in a front wheel drive automobile.

A further object of the invention is to provide an improved form of universal joint wherein friction between the driving and driven members caused by misalignment of the driving and driven shafts is reduced to a minimum, whereby a high transmission efficiency is obtained.

Another object of the invention is to provide a universal joint which is encased by intermeshing relatively stationary spherical shells which serve to protect the rotating mechanism from injury and to guard against unintentional contact therewith.

A still further object of the invention is to provide a universal joint which is constructed in such manner as to avoid the creation of undue stresses therein when the driving and driven shafts are not in alignment, whereby the structural elements may be made relatively light and are also subjected to less wear than occurs in conventional types of universal joints.

Still another object of the invention is to provide an improved form of universal joint wherein the driving and driven shafts each rotate at a uniform velocity despite misalignment thereof, rather than oscillating about a mean velocity as occurs in most of the universal joints heretofore known.

These and other objects of the invention will be more fully understood upon a perusal of the following specification taken in conjunction with the accompanying drawing, wherein:

Fig. 1 is a perspective view of a universal joint constructed in accordance with the invention, with the driving and driven shafts shown out of alignment;

Fig. 2 is a longitudinal sectional view of the universal joint shown in Fig. 1, with the driving and driven shafts shown in alignment; and Fig. 3 is a transverse sectional view of the universal joint, taken along the line 3—3 of Fig. 2.

Described briefly, the universal joint, or fluid coupling, of the present invention comprises a pair of concentric spherical shells forming a fluid-tight chamber within which there is disposed an impeller and a runner, which are likewise constructed in the form of concentric spherical shells. A driving shaft is journaled in one of the outer shells and is coupled to one of the inner shells, or the impeller. A driven shaft is journaled in the other outer shell and is coupled to the other inner shell, or the runner. The impeller shell is provided with a series of arcuate vanes spaced about the periphery thereof and lying in planes which include the axis of rotation of the driving shaft. The runner shell is provided with a plurality of arcuate grooves spaced about the periphery thereof and lying in planes which include the axis of rotation of the driven shaft. When the driving shaft is rotated, the impeller vanes force the transmission fluid through openings in the impeller shell against the runner shell to effect rotation thereof in the manner of a turbine.

Referring now particularly to Fig. 2 of the drawing, there is shown a pair of concentric spherical shells 4 and 6, each of which is constructed in two parts, 4a—4b and 6a—6b, to facilitate assembly thereof. The outermost shell 4 has a hub 8 extending therefrom which is riveted to a housing 10 encasing a driven shaft 12. The shaft 12 is journaled in the hub 8 by a ball bearing unit 14, which is secured in place by an annular ring 16 threaded into the hub 8.

In like manner, the shell 6 is provided with a hub 18 which is riveted to a housing 20 encasing a driving shaft 22. The driving shaft 22 is journaled in the hub 18 by means of a ball bearing unit 24, which is secured in place by an annular ring 26 threaded into the hub 18. Oil seals 28 and 30 are provided to prevent escape of oil from the fluid chamber formed by shells 4 and 6 into the space between the driving or driven shaft housings and the shafts which they encase.

A sealing ring 32, which is retained in an annular recess in the spherical shell 4, is provided to prevent leakage of oil from the fluid chamber through the space between the shells 4 and 6. It is to be understood that oil is allowed to penetrate the space between shells 4 and 6 up to the sealing ring 32 to serve as a lubricant which promotes sliding of one of these shells upon the other when the angle between the axes of the driving and driven shafts changes.

The driven shaft 12 terminates in a flange 34 having tapped holes in which cap screws 36 are threaded after passing through clearance holes in a hub 38 formed on a runner shell 40, which is constructed in two parts, 40a and 40b, to facilitate assembly of the joint. The driving shaft 22 is likewise provided with a flange 42 having tapped holes in which cap screws 44 are threaded after passing through clearance holes in a hub 46 formed on an impeller shell 48.

A series of impeller vanes or blades 50 are secured to the inner wall of the impeller shell 48 by means of machine screws 52, which pass through counter-bored openings in the shell 48 into tapped openings in flanges 54 formed on the impeller blades. On each side of the impeller blades 50 there extend rows of circular openings 56 and 58 in the impeller shell 48. The openings 56 on one side of each of the impeller blades diverge in one direction from a radial line passing therethrough and the openings 58 on the other side diverge in the opposite direction, as may best be seen in Fig. 3. The impeller shell 48 is also provided with a series of openings 60, spaced around the hub portion 46, for a purpose to be described hereinafter.

As may best be seen in Fig. 3, the runner shell 40 is provided with a series of arcuate grooves 62 extending from an open portion of the shell to a point near the hub 38 thereof. The space between the impeller shell 48 and the runner shell 40 is made very small, say in the order of .005 inch to .025 inch, depending on the size of the joint and the particular application in which it is employed.

The transverse cross section of the impeller blades 50 is concave, whereby they form scoops which force the fluid transmission medium outwardly through adjacent openings 56 or 58, depending on the direction of rotation of the impeller shell. Assuming that the impeller shell 48 is rotating clockwise, as viewed in Fig. 3, the impeller blades 50 will force the fluid medium outwardly through the openings 58 adjacent thereto, which openings are skewed so as to cause the fluid issuing therefrom to impinge on the runner shell 40 at a higher velocity than the surface velocity of the impeller shell 48. As the fluid medium ejected through the openings 58 impinges on the side walls of the grooves 62 in the runner shell 40, a portion of the kinetic energy of the fluid is transferred to the runner shell causing it to rotate in a clockwise direction, as viewed in Fig. 3. If the impeller shell 48 is rotated in the opposite direction, the fluid transmission medium is forced outwardly through the openings 56 to impinge on the opposite side walls of the grooves 62 in the runner shell 40, causing it to rotate in the reverse direction.

The fluid chamber formed by shells 4 and 6 is filled with transmission fluid through an opening 64 in the outermost shell 4, which opening is normally sealed by a plug 66 threaded therein. The fluid which is ejected from the impeller shell 48 and impinges on the runner shell 40 flows along the grooves therein toward the hub 38, or toward the opening on the opposite side of the shell, and thence flows through the opening in the impeller shell opposite the hub 46 thereof, or through the openings 60 spaced around the hub 46.

It should be apparent that, by reason of the spherical configuration of the impeller and the runner elements of the universal joint, power will be transmitted from one element to the other despite misalignment of the driving and driven shafts. It should also be apparent that, due to the symmetrical relation of the driving and driven elements thereof for any position thereof with a fixed angle between the axes of the shafts the driven shaft will rotate at a uniform velocity, assuming that the driving shaft rotates at a uniform velocity. The speeds of the two shafts will usually be different however. As there is no mechanical contact between the driving and driven members, there is very little frictional loss created by the relative motion between the shells 40 and 48 which occurs when the shafts 12 and 22 are not in alignment.

It is to be understood that the impeller and runner elements may consist of driving and driven vanes which are self-supporting and are disposed in concentric spherical surfaces, instead of attaching impeller vanes to one spherical shell and forming runner vanes in a second spherical shell by milling grooves in the surface thereof. It should also be understood that the impeller shell may have blades of suitable construction placed on its outside surface rather than on its inside surface, and thus may be disposed on the outside of the runner shell which then must have grooves in the outer rather than the inner surface.

Since the stresses in the rotating elements are no greater when the driving and driven shafts are out of alignment than they are when these shafts are aligned, the parts need only be constructed strong enough to withstand the stresses which occur when power is being transmitted between aligned shafts. Therefore, a light weight and compact universal joint, constructed in accordance with the principles of the present invention, is capable of transmitting considerable power since the cushioning effect of the oil avoids the creation of any undue stresses therein. At the same time the power loss due to friction is reduced when the driving and driven shafts are out of alignment, as compared with conventional universal joints, since the frictional forces are usually much greater in conventional universal joints when the shafts are out of line.

When the lubricating oil used with a conventional universal joint runs low, rapid wearing occurs and can oftentimes go unnoticed until the joint has been badly scored or otherwise damaged. The present universal joint is practically self-protecting in that a loss of oil immediately evidences itself by reason of the fact that the efficiency of power transmission is greatly reduced; and, in the extreme case of complete loss of oil, power transmission may fail completely.

While a particular embodiment of the invention has been disclosed by way of illustration, it should be apparent that various modifications may be made therein without departing from the invention in its broader aspects, and therefore the aim of the appended claims is to cover all such modifications as fall within the true spirit and scope of the invention.

Having thus described the invention, what is claimed as new and desired to be secured by Letters Patent is:

1. In combination, a driving shaft, a driven shaft, said shafts having different axes of rotation which may be relatively varied, and a hydrodynamic coupling including coupling parts capable of substantially universal angular movement relative to each other and joining said shafts to transmit power therebetween, said hydro-dynamic coupling including impeller blades fixed on said driving shaft and cooperating turbine blades fixed on said driven shaft, and said blades being respectively shaped to afford angular movement of one coupling part relative to another.

2. In combination, a driving shaft, a driven shaft, said shafts having axes of rotation which may be relatively varied, and a hydro-dynamic coupling for joining said shafts and including a set of impeller blades fixed on said driving shaft and a set of cooperating turbine blades fixed on said driven shaft, said impeller and turbine blades being operative to transmit power from the driving shaft to the driven shaft for either direction of rotation of the driving shaft to cause the driven shaft to rotate in like direction, and each set of blades being of substantially truncated spherical form and relatively positioned one within the other to afford a coupled driving connection therebetween, and means maintaining the relative position of the sets of blades one within the other while providing for substantially universal relative shifting therebetween whereby rotation of the driving and driven shafts may be effected with their axes of rotation out of alignment.

3. In combination, a driving shaft, a driven shaft, the angular relation between the axes of rotation of said shafts being variable, and a hydro-dynamic universal joint including mechanical parts universally coupled by a fluid medium coupling said shafts, said universal joint coupling including ball and socket members, said members being fixed on said driving shaft and on said driven shaft, impeller blades on one of said members, and cooperating turbine blades on the other of said members, said universal joint being operative to transmit power to the driven shaft from the driving shaft for either direction of rotation of the driving shaft to cause the driven shaft to rotate in a like direction.

4. A hydro-dynamic coupling comprising an impeller having a plurality of impeller blades, a runner having a plurality of turbine blades, a casing filled with a fluid transmission medium and enclosing said impeller and said runner, a driving shaft fixed to said impeller and sealed in fluid-tight relation to said casing, a driven shaft fixed to said runner and sealed in fluid-tight relation to said casing, and said casing including spherical shells concentrically movable in any direction with respect to each other whereby to permit relative angular disposition of the axes of the coupled driving and driven shafts.

5. A universal joint comprising an impeller, a runner, said impeller and runner being constructed in the form of nested and interconnected truncated spheres of different diameters carrying opposed impeller and runner blades and being disposed in concentric relation, said impeller and runner being shiftable substantially universally relative to one another, and a casing filled with a fluid transmission medium and enclosing said impeller and runner.

6. A universal joint comprising a pair of concentric spherical shells forming a fluid-tight casing, said shells being concentrically movable in any direction with respect to each other, a driving shaft sealed in fluid-tight relation to one of said shells, a driven shaft sealed in fluid-tight relation to the other of said shells, an impeller secured to said driving shaft and disposed within said casing, a runner secured to said driven shaft and disposed within said casing in close proximity to said impeller, and a fluid transmission medium in said casing.

7. A universal joint comprising a pair of concentric spherical shells forming a fluid-tight casing, said shells being concentrically movable in any direction with respect to each other, a driving shaft sealed in fluid-tight relation to one of said shells, a driven shaft sealed in fluid-tight relation to the other of said shells, a spherically shaped impeller secured to said driving shaft and concentrically disposed within said casing, a spherically shaped runner secured to said driven shaft and concentrically disposed within said casing in close proximity to said impeller, and a fluid transmission medium in said casing.

8. Power transmission device comprising coupling parts capable of substantially universal angular movement relative to each other, and hydraulic drive means formed in said coupling parts for rotating one part from rotation of the other, said drive means including impeller blades and turbine blades on said parts respectively shaped to afford angular movement of one part relative to the other.

9. A power transmission device as set forth in claim 8 wherein the coupling parts comprise ball and socket members.

10. A power transmission device as set forth in claim 8 wherein the coupling parts comprise substantially truncated spheres concentrically disposed.

11. A power transmission device comprising a universal coupling having a substantially spherical ball-like part fitting within a shell part and interconnected for permissive relative angular disposition between the axes thereof, impeller vanes rigid with said spherical coupling part and arranged concentrically, blade means rigid with the shell coupling part and in opposed relation with said impeller vanes, and liquid within the coupling parts so that rotative movement of one part through the vanes and blades imparts corresponding movement to the other part in any one of a number of relative angular positions thereof.

EDWIN L. RUBERTS.
EDWIN M. RUBERTS.

REFERENCES CITED

The following references are of record in the file of this patent:

UNITED STATES PATENTS

| Number | Name | Date |
|---|---|---|
| 1,078,710 | Weir | Nov. 18, 1913 |
| 1,291,871 | Hein | Jan. 21, 1919 |
| 1,428,586 | Garrison | Sept. 12, 1922 |
| 1,583,736 | Nydqvist | May 4, 1926 |
| 1,667,565 | Radcliffe | Apr. 24, 1928 |
| 1,885,746 | Martin | Nov. 1, 1932 |
| 2,182,049 | Henry | Dec. 5, 1939 |
| 2,401,376 | Sherman | June 4, 1946 |

FOREIGN PATENTS

| Number | Country | Date |
|---|---|---|
| 67,202 | Sweden | Apr. 16, 1929 |